US011636853B2

United States Patent
Howard

(10) Patent No.: US 11,636,853 B2
(45) Date of Patent: Apr. 25, 2023

(54) NATURAL LANGUAGE GRAMMAR IMPROVEMENT

(71) Applicant: SoundHound, Inc., Santa Clara, CA (US)

(72) Inventor: Angela Rose Howard, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 717 days.

(21) Appl. No.: 16/546,177

(22) Filed: Aug. 20, 2019

(65) Prior Publication Data
US 2021/0056960 A1    Feb. 25, 2021

(51) Int. Cl.
| | | |
|---|---|---|
| *G10L 15/00* | (2013.01) | |
| *G10L 15/19* | (2013.01) | |
| *G10L 15/22* | (2006.01) | |
| *G06F 40/253* | (2020.01) | |
| *G06F 40/279* | (2020.01) | |
| *G10L 15/26* | (2006.01) | |
| *G10L 15/18* | (2013.01) | |

(52) U.S. Cl.
CPC ............ *G10L 15/19* (2013.01); *G06F 40/253* (2020.01); *G06F 40/279* (2020.01); *G10L 15/22* (2013.01); *G10L 15/1815* (2013.01); *G10L 15/26* (2013.01); *G10L 2015/223* (2013.01)

(58) Field of Classification Search
CPC combination set(s) only.
See application file for complete search history.

*Primary Examiner* — Vu B Hang
(74) *Attorney, Agent, or Firm* — Haynes Beffel & Wolfeld LLP; Andrew L. Dunlap

(57) ABSTRACT

A method for configuring natural language grammars is provided to include identifying a first transcription having a first automatic speech recognition (ASR) score and a first natural language understanding (NLU) score and identifying a second transcription having a second ASR score and a second NLU score. The method includes detecting that a difference between the first and second ASR scores has a signed value with an opposite sign than a sign of a signed value of a difference between the first and second NLU scores, and responsive to detecting the opposite sign providing, to an evaluator, the audio query and the first and second transcriptions, receiving, from the evaluator, an indication of which of the first and second transcriptions is a correct transcription, and adjusting a value implemented to calculate the first NLU score or a value implemented to calculate the second NLU score.

13 Claims, 6 Drawing Sheets

NATURAL LANGUAGE GRAMMAR IMPROVEMENT

FIELD OF INVENTION

The technology disclosed relates to improving grammar rules (i.e., grammars) applied to transcriptions by speech recognition and natural language understanding systems. This is done by implementing an evaluator to aid in adjusting weights of weighted grammars of one or more domains, automatically training weights of weighted grammars and replacing natural language understanding chosen phrasings with new phrasings.

BACKGROUND

Selection between multiple transcription hypotheses in a system of automatic speech recognition (ASR) and natural language understanding (NLU) is generally determined using a combination of (i) ASR scores and (ii) NLU scores for each hypothesis. The combined scores can be weighted as well. For example, the ASR scores can be weighted at 0.75 and NLU scores can be weighted at 0.25. This is just an example and other weighting schemes can be implemented. However, regardless of the weighting scheme a problem often arises where the NLU score for a particular transcription is higher than the NLU score for the correct transcription hypothesis by a great enough amount that it causes the combined score to be higher for the incorrect transcription than the correct one, even though the ASR score for the correct transcription hypothesis is higher. Since it is the combined score that is used to determine what interpretation a system should use, it is important that the combined score be highest for the correct interpretation. When this problem arises, usually the differences are only by small amounts. This will cause the speech recognition and natural language understanding system to select an incorrect interpretation. This problem is often a result of poor human-chosen grammar and/or domain phrasing weights.

This problem can be solved using the technology disclosed, as described in more detail below.

SUMMARY

The technology disclosed relates to improving grammar rules (i.e., grammars) applied to transcriptions by speech recognition and natural language understanding systems by aiding an evaluator in adjusting weights of weighted grammars of one or more domains, automatically training weights of weighted grammars and adding and replacing natural language understanding chosen-phrasings with new phrasings.

Specifically, the technology disclosed is able to determine when grammar correction is to be performed as a result of poor grammar rules (i.e., grammars) being applied to a user query subjected to automatic speech recognition (ASR) transcriptions and natural language understanding (NLU) interpretations. Once the technology disclosed has determined that grammar correction is warranted, then an evaluator can adjust weights that are applied to weighted grammars and/or domains that were used to perform the NLU interpretations. Additionally, once grammar correction is warranted, the technology disclosed can also automatically train weights assigned to the weighted grammars and/or domains. Further, if grammar correction is warranted, the technology disclosed can replace a NLU-chosen phrasing of a particular transcription with a new phrasing from the particular transcription.

Particular aspects of the technology disclosed are described in the claims, specification and drawings.

DETAILED DESCRIPTION

Figure 1:
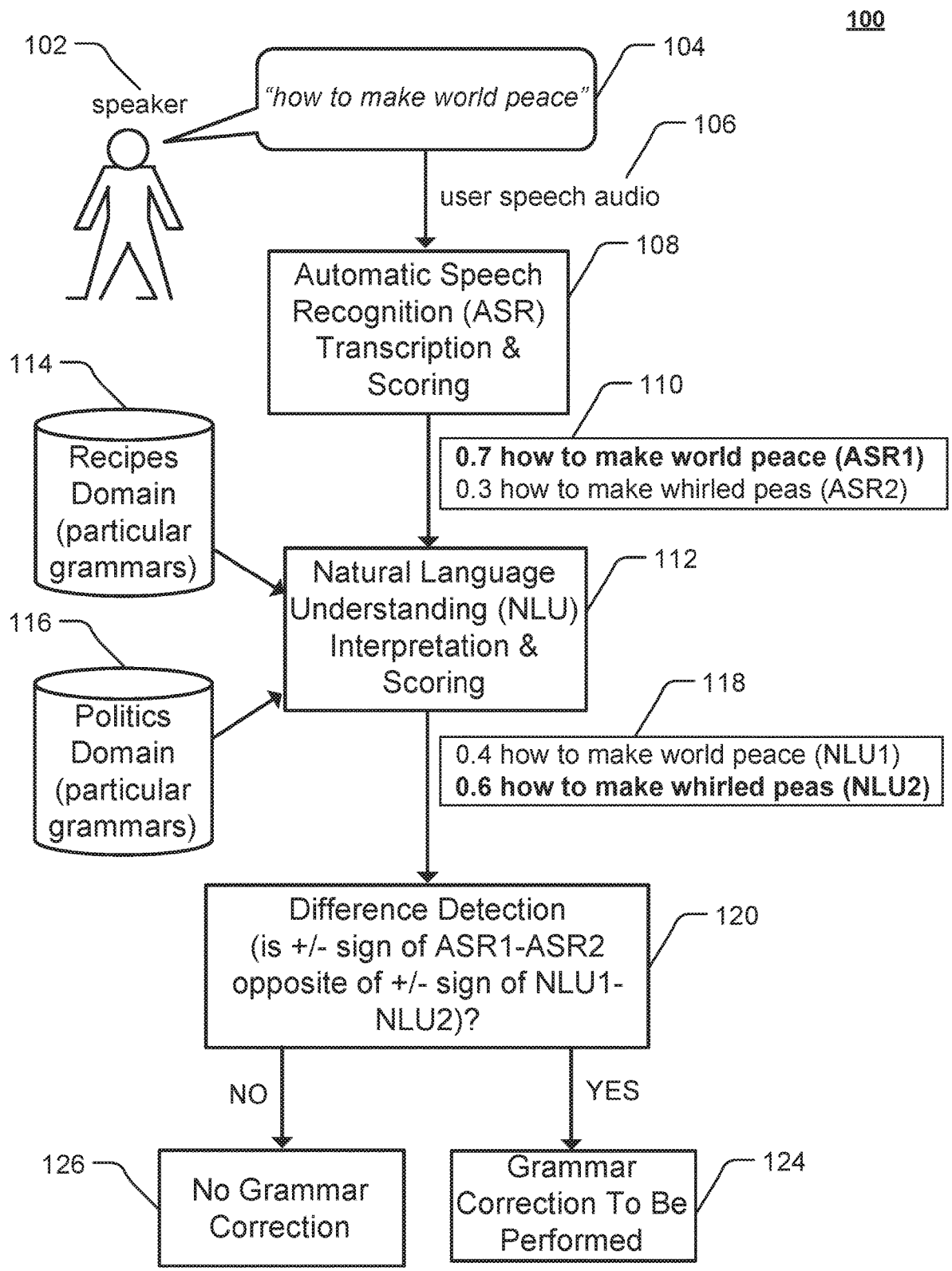
FIG. 1 illustrates a block diagram of an example environment that identifies automatic speech recognition (ASR) transcription and natural language understanding (NLU) interpretation scorings and determines whether or not grammar correction is to be performed.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Before the specifics of FIG. 1-6 are discussed, a high-level overview of speech recognition and natural language understanding systems will be provided along with an example problem that can be solved by the technology disclosed.

Speech recognition and natural language understanding systems generally receive speech audio that includes natural language utterances. An example of speech audio would be a recording of a person speaking the phrase "how to make world peace." The speech audio can be received from any source (e.g., a mobile phone, a washing machine, a vehicle, etc.).

The speech audio is then typically analyzed by an acoustic front end using an acoustic model to extract phonemes from the speech audio. This is often times referred to as acoustic recognition. Various different acoustic models (general or customized) and phoneme sets (e.g., the one described by the Carnegie Mellon University (CMU) phonemic codes) can be implemented based on the received speech audio.

Next, the phonemes generated by the acoustic front end are received by a language model which can be implemented to choose a most-likely sentence consisting of a string of phonemic codes, such as "how to make world peace." For many reasons, a simple speech audio from a user can result in multiple transcriptions, each having a different transcription score that will aid in the selection of the best or most accurate transcription. The reason for multiple transcriptions is that speech recognition is probabilistic and never certain. However, as will be discussed later, these multiple transcriptions can also lead to a selection of an incorrect interpretation of the actual utterance. These steps performed using the acoustic front end and the language model are typically referred to as an ASR transcription.

Once one or more transcriptions are determined and scored, NLU interpretation is performed by an NLU system to extract meaning from the various transcriptions. Meaning is associated with the transcription based on a grammar (grammar rule) associated with a domain. For example, if the domain is related to searching for information regarding politics, then the meaning applied to the transcription "how to make world peace" could implement a search for political or governmental viewpoints related to maintaining peace across the globe.

Keeping the above in mind, consider the following problem. A user provides speech audio that includes a ten-digit number, such as 2223334567, which ends in the number 7. A correct transcription would lead to interpreting the utterance as a telephone number. However, in an alternative transcription the 7 was instead transcribed as "Seva." As a result, the incorrect transcription is "222333456Seva." The NLU interpreted the incorrect transcription as the first 9 digits being a complete US zip code and then "Seva," which also happens to be the name of an eyelash extension shop, as a search for beauty services. Since the weights of the NLU grammar for the beauty services domain is strong relative to the weight for the telephone domain, it causes that score for the incorrect interpretation to be higher than the score for the correct interpretation. As a result, the speech recognition and natural language understanding system looks for "Seva" or other eyelash extension shops in a particular U.S. zip code, as opposed to looking up or dialing a specific telephone number. One way to address this problem would be to create a rule that does not allow ASR to place names following a 9-digit zip code when that is the entire utterance. However, such a rule is very specific, and it is more efficient to address the root of the problem. Therefore, the technology disclosed addresses this problem without creating special rules for each particular circumstance and by adjusting weights of weighted grammars and/or domains as well as replacing phrasings chosen for NLU interpretations with new phrasings.

FIG. 1 illustrates a block diagram of an example environment 100 that identifies automatic speech recognition (ASR) transcription and natural language understanding (NLU) interpretation scorings and determines whether or not grammar correction is to be performed.

Referring to FIG. 1, a speaker or user 102 provides an audio query 104 "how to make world peace" to a speech recognition and natural language understanding system. As mentioned above, this audio query 104 can be provided using any type of device that is part of a natural language understanding system. For example, it can be captured by a mobile device using a microphone. For another example, it can be received by a server as an audio file or stream over the internet.

The audio query 104 is sent as user speech audio 106 to an ASR transcription and scoring module 108. As discussed above, the ASR transcription and scoring module 108 computes multiple ASR transcriptions and scorings of the audio query 104 (the user speech audio 106). As illustrated in FIG. 1, the audio query 104 "how to make world peace" is transcribed by the ASR transcription and scoring module 108 into two different transcriptions and scores 110. Specifically, the audio query 104 is transcribed to (i) "how to make world peace" with a score of 0.7 and (ii) "how to make whirled peas" with a score of 0.3. The transcription "how to make world peace" and corresponding score can also be referred to as ASR1 and the transcription "how to make whirled peas" and corresponding score can also be referred to as ASR2. Some systems normalize the scores of all ASR transcription hypotheses such that their sum is 1. As described in more detail below, since the indicator of an NLU error is the opposition of a sign (i.e., positive or negative sign) of the difference of NLU scores and a sign of the difference of ASR scores between top-two competing transcription hypotheses, normalization is not strictly necessary. In this example environment 100, only two transcriptions and scores are considered, but in other examples, many more transcriptions and scores can be considered. Typically, a lattice of tens or hundreds of transcription hypotheses will be considered for NLU interpretations. Most systems achieve sufficiently accurate NLU error hypotheses by comparing score differentials between just the top two hypotheses. However, error hypothesis algorithms that consider more than the top two hypotheses are possible, especially if the top three or more hypotheses all have close ASR scores or close NLU scores. Other scoring schemes that would be apparent to a person of ordinary skill in the art could be introduced.

After the transcriptions and scores 110 are obtained by the ASR transcription and scoring module 108, the transcriptions and scores 110 are provided to an NLU interpretation and scoring module 112 that performs NLU interpretation of both of the ASR transcriptions. As illustrated in FIG. 1, the NLU interpretation and scoring module 112 implements two different domains to interpret the two different transcriptions. The domains can be selected by the NLU interpretation and scoring module 112 or some other manner based on the contents of the transcriptions or based on other factors that would be apparent to a person of ordinary skill in the art. As illustrated, the NLU interpretation and scoring module 112 implements a recipes domain 114 to interpret the phrase "how to make whirled peas" using particular grammars assigned to the recipes domain 114 and the NLU interpretation and scoring module 112 implements a politics domain 116 to interpret the phrase "how to make world peace" using particular grammars assigned to the politics domain 116. The result of the NLU interpretations are illustrated as interpretations and scores 118.

The transcription "how to make world peace" is interpreted by the NLU interpretation and scoring module 112 as being grammatically meaningful, to a moderate degree, in the politics domain and, after weighting of NLU scores, produces an ASR and NLU combined score of 0.4. Since the combined score is what the system uses to respond, the signal of interest for calculating likely NLU errors is the opposition of signs (for the top scoring transcriptions) between the difference in combined scores and the difference in ASR scores. Further, the transcription "how to make whirled peas" is interpreted by the NLU interpretation and scoring module 112 as being grammatically meaningful, to a relatively higher degree, in the recipes domain and is assigned a combined score of 0.6. The interpretation "how to make world peace" and corresponding score can also be referred to as NLU1 and the interpretation "how to make whirled peas" and corresponding score can also be referred to as NLU2.

As illustrated, the score of 0.6 is assigned to NLU2 because the interpretation "how to make whirled peas," in the context of the recipes domain 114 has a higher score than the interpretation "how to make world peace," in the context of the politics domain 116. This higher scoring of NLU2 as opposed to NLU1 leads to an incorrect selection of a transcription and interpretation by a speech recognition and natural language understanding system, even though the score of the correct transcription, ASR1, is higher than the score of ASR2. Some speech recognition and natural language understanding systems can assign a different weighting to ASR transcriptions and to NLU interpretations, such that the ASR transcription scores are given an overall higher weight than the NLU interpretation scores, or vise-versa.

In this example environment 100, only two interpretations and scores are considered, but in other examples, many more interpretations and scores can be considered. Additionally, there can be multiple NLU interpretations (and scores) for a single ASR transcription. For example, multiple grammars and/or domains can be matched or selected for a single ASR transcription, resulting in more NLU interpretations (and scores) than ASR transcriptions. The NLU interpretation and scoring module 112 chooses the highest scoring interpretation across all domains for each transcription before computing the combined score of the ASR score and the NLU score. Other scoring schemes that would be apparent to a person of ordinary skill in the art could be introduced.

A difference detection module 120 is used to determine whether or not grammar correction is appropriate (i.e., whether or not an NLU error has occurred). Specifically, the difference detection module 120 determines a difference between ASR1 and ASR2. This can also be referred to as the first difference. Here, in this example, the first difference would be 0.3 (i.e., 0.7 [ASR1]−0.4 [ASR2]=0.3). The difference detection module 120 also determines a difference between NLU1 and NLU2. This can be referred to as the second difference. Here, in this example, the second difference would be −0.3 (i.e., 0.3 [NLU1]−0.6 [NLU2]=−0.3). The difference detection module 120 will then consider whether each of the first difference and the second differences is a positive or negative value.

Here a value of the first difference between ASR1 and ASR2 is a positive value and a value of the second difference between NLU1 and NLU2 is a negative value. If the positive/negative value of the first difference between ASR1 and ASR2 is different from the positive/negative value of the second difference between NLU1 and NLU2, then the difference detection module 120 determines that grammar correction is to be performed in operation 124. In contrast, if the positive/negative value of the first difference between ASR1 and ASR2 is the same as the positive/negative value of the second difference between NLU1 and NLU2, then the difference detection module 120 determines that grammar correction is not to be performed 126. The differences between the ASR scores and the NLU scores can be determined in a different order. For example, the ASR1 score can be subtracted from the ASR2 score and the NLU1 score can be subtracted from the NLU2 score. However, the same order must be followed for both the ASR and NLU scores. For example, the difference detection module 120 would not be able to determine whether or not grammar correction should be performed if the ASR1 score was subtracted from the ASR2 score (i.e., ASR2−ASR1), but then the NLU2 score was subtracted from the NLU1 score (NLU1−NLU2).

In order to make a determination, the difference detection module 120 is concerned with whether or not the positive/negative value of the first difference is the same as or different from the positive/negative value of the second difference. In the example of FIG. 1, the positive/negative values are different, such that grammar correction is to be performed. Grammar correction here is appropriate because based on only the NLU interpretation and scoring, a speech recognition and natural language understanding system would select "how to make whirled peas" as the correct interpretation because of the higher score. This clearly is the incorrect selection, based on the audio query 104 "how to make world peace."

Figure 2:
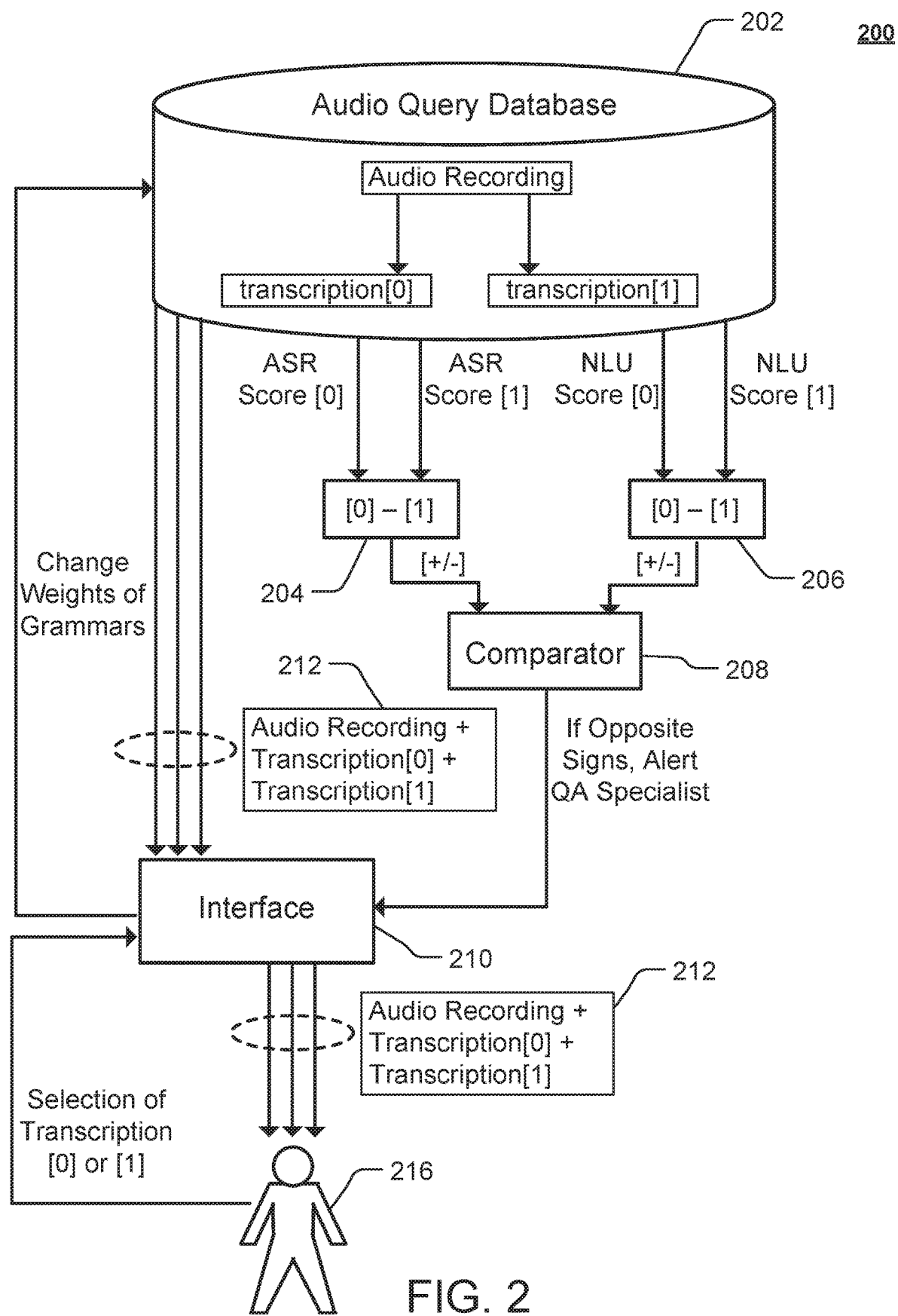
FIG. 2 illustrates a block diagram of a more detailed environment that identifies whether or not grammar correction is to be performed and that includes an evaluator to identify a correct transcription of an audio query.
Figure 3:
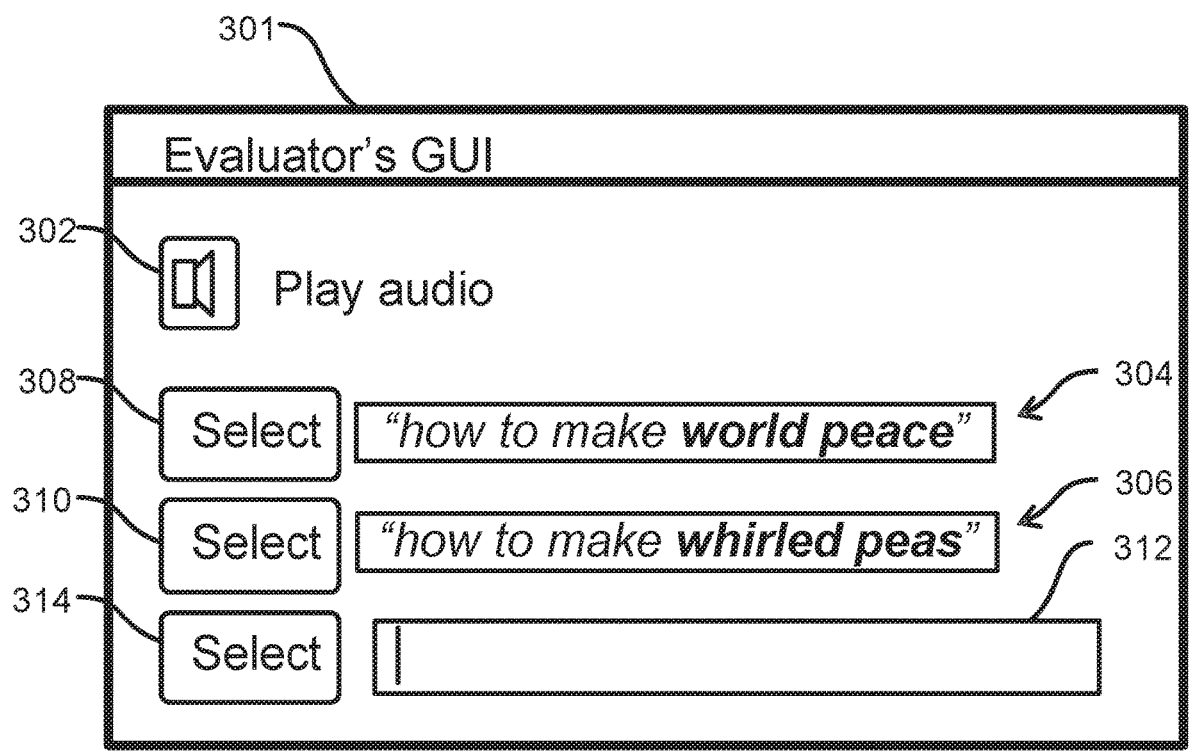
FIG. 3 illustrates a graphical user interface (GUI) for evaluators to indicate correct transcriptions for automatic grammar improvement.

FIGS. 2 and 3 describe different approaches of performing grammar correction.

FIG. 2 illustrates a block diagram of a more detailed environment 200 that identifies whether or not grammar correction is to be performed and that includes an evaluator to identify a correct transcription of an audio query.

Referring to FIG. 2, an audio query database 202 is provided to include multiple audio recording of user queries. An example of an audio recording of a user query would be the audio query 104 of "how to make world peace." As discussed above with reference to FIG. 1, the audio query database 202 also stores each of the transcriptions of the audio queries. In this example, "transcription[0]" could refer to the transcription "how to make world peace" and "transcription[1]" could refer to the transcription "how to make whirled peas."

Furthermore, as discussed above with reference to FIG. 1, the speech recognition and natural language understanding system determines ASR scores and NLU scores for each of the transcriptions. The audio query database 202 can store the ASR and NLU scores along with each of the transcriptions. Alternatively, the ASR and NLU scores of transcription[0] and transcription[1] can be stored in a separate database or information regarding transcription[0] and transcription[1] can be stored such that the ASR and NLU scores can be recalculated, such as by different ASR and NLU systems or system configurations.

Subtractor 204 subtracts ASR score [1] from ASR score [0] and outputs a value indicating whether this first subtraction resulted in a positive or negative value. Subtractor 206 subtracts NLU score [1] from NLU score [0] and outputs a value indicating whether this second subtraction resulted in a positive or negative value. Subtractor 204 and subtractor 206 can be a single unit or separate units. As discussed above with reference to FIG. 1, the order of subtraction can be different, but it should be the same for both the ASR and NLU scores.

Comparator 208 compares the positive/negative value resulting from the first subtraction to the positive/negative value resulting from the second subtraction to determine whether or not the positive/negative values are the same or the opposite. If the positive/negative values are opposite, then grammar correction is to be performed. If the positive/negative values are the same, then grammar correction should not be performed.

Once it is determined that grammar correction should be performed, a quality assurance (QA) specialist may be alerted and information 212 including the audio recording, transcription[0] and transcription[1] is provided to an interface 210 that is accessible by an evaluator 216 (e.g., the QA specialist). The information 212 is then provided to the evaluator 216 for making an evaluation. The evaluator 216 can be a person, who uses the interface 210 to listen to the audio recording and then consider whether transcription[0] is the correct transcription or whether transcription[1] is the correct transcription or whether they are both incorrect. As discussed in more detail below, the evaluator 216 can be a person, such as a QA specialist, or it may be another computer system designed to identify or select the correct transcription.

After the evaluator 216 provides or selects the correct transcription, the interface 210 will allow the weights of the grammars (and/or domains) used to interpret the audio recording to be adjusted so as to improve future transcriptions and interpretations of the same or similar audio queries. Additionally, a computing system that provides the interface 210 can change the weights of the grammars and/or it can allow the evaluator 216 to change the weights of the grammars. By adjusting the weights of the grammars, values that are implemented to calculate NLU score [0] and/or NLU score [1] are adjusted such that if the same audio query is received, the correct transcription can be selected and its interpretation used. These values can be adjusted by increasing a weight for the weighted grammar that is associated with the correct transcription selected by the evaluator 216 or by decreasing a weight for the weighted grammar associated with the transcription that is not identified as being the correct transcription.

Some systems allow the evaluator to edit the text of grammars, such as using a text editor, and recompile the edited grammars into an improve NLU module. Some systems provide a graphical interface showing the grammar used for the correct and the selected incorrect interpretation with their weights in one color and, for each weight, the closest value that, if used, would have caused the system to choose the correct transcription. In such a system, the evaluator can simply choose one or another weight to change to correct the system's behavior. In some systems, the evaluator can select or edit the weights for grammar rules to any value, which allows them to make changes greater than the minimum change needed to correct the system behavior.

Some systems, once an evaluator indicates the correct transcription, will automatically adjust any one or some combination of weights for the grammars used to interpret the correct and the incorrectly chosen transcriptions such that the system would have chosen the correct transcription. In such a system, by evaluators simply choosing correct transcriptions, such as by clicking a button in a GUI, the system automatically improves weights. Over the course of many corrected transcriptions, the weights of all grammars in the system will tend towards an equilibrium that gives the most accurate possible ASR and NLU for any future utterances.

FIG. 3 illustrates an environment 300 that includes a GUI 301 for evaluators. It comprises a graphical button 302 for an evaluator to click using a graphical pointer to cause the system to play the speech audio for an utterance any number of times. The GUI 301 shows two most likely transcriptions 304 and 306. Which two of potentially many transcription hypotheses can be determined by those having the two highest ASR scores, the two highest NLU scores across all possible grammars, or the two highest of a combination of ASR and NLU scores. It is not actually necessary that the GUI 301 show the transcription that a system used to interpret a user utterance. Keep in mind that evaluation can be performed on old recordings being evaluated by newer, improved ASR and NLU algorithms.

An evaluator using the GUI 301 can simply click a first button 308 or second button 310 to indicate that the first transcription 304 or second transcription 306, respectively, is correct for the played audio. In another embodiment, a system can show, instead or in addition to the transcription, an indication of the systems' response to the user. When the evaluator clicks a Select button, a new utterance with its two most likely transcriptions appears and the audio automatically plays. By being able to automatically hear audio and immediately simply click one or another transcription, evaluators can very efficiently provide corrections for the system. In a further aid to evaluator efficiently, the system performs a "diff" between the two transcriptions 304 and 306 and highlights the words within the transcriptions that are different. This draws the evaluator's attention to and concentration on the part of the utterance that is most key to distinguishing between the two transcriptions. If the difference between transcriptions is near the beginning of the utterance, an evaluator can assume that the end of the utterance is transcribed correctly and click one of the select button before the end of playing the audio in order to move to the next utterance even more quickly.

In some cases, it is possible that both the first transcription 304 and second transcription 306 are both incorrect. The GUI 301 provides a further text box 312 and associated select button 314 that that allow for entering a correct transcription. Manual corrections of badly recognized transcriptions are particularly useful as training data to improve the accuracy of ASR acoustic models.

The system uses the evaluator input through the GUI 301 to label user audio with correct transcriptions. It also uses the interpretation of the evaluator-selected transcription as the target interpretation for adjusting grammar weights. A training method can calculate a cost function across all of the weights of all grammars in a system where the cost function is based on the number of queries that would be interpreted correctly. By applying a gradient descent training algorithm to the grammar weights, the system can learn the ideal weights for each grammar rule to optimize the accuracy of an ASR-NLU system.

Turning back to FIG. 2, for example, if transcription[0] is selected as the correct transcription by the evaluator 216, then the weight for the weighted grammar associated with transcription[0] can be increased so that transcription[0] will have a higher NLU score next time. Also, if transcription[0] is selected as the correct transcription by the evaluator 216, then the weight for the weighted grammar associated with transcription[1] can be decreased so that the transcription[1] will have a lower NLU score next time.

In an implementation the amount of adjusting the weights will result in the comparator 208 no longer identifying a difference between the positive/negative values of the first and second differences. Further, the evaluator 216 need not be a person, such that the evaluator 216 can be a computer system that employs artificial intelligence to provide the indication of which transcription is the correct transcription. The artificial intelligence of the computer system can be implemented to identify the correct transcription better than the speech recognition and natural language understanding system because the nature of the speech recognition and natural language understanding system requires real-time response times, whereas the artificial intelligence can take more time and/or more resources to predict the correct transcription and interpretation.

Additionally, since adjusting the weights of a grammar affects how strongly it will interpret other utterances, the technology disclosed can involve running a set of regression diagnostic tests for a set of transcriptions with known correct interpretations. If the adjusted weight causes existing regression tests to fail, the weight adjustment should be reconsidered. Furthermore, the technology disclosed may determine whether or not the ASR score of the correct transcription is lower than the ASR score of the transcription that is not identified as the correct transcription, such that when the ASR score of the correct transcription is determined to be lower, an indication of a domain error or a grammar error, meaning that an incorrect domain and/or grammar is associated with the correct transcription, is provided to a developer along with the correct transcription.

The technology disclosed can also highlight or identify words that are present within the correct transcription and that are not present within the transcription that is not identified as the correct transcription. As an alternative to (or in conjunction with) employing the evaluator 216 to identify the correct transcription, the technology disclosed can identify the phrasings that matched each of transcription[0] and transcription[1]. The system can increase the weight of the phrasing matched by the transcription with the lower combined score or decrease the weight of the phrasing matched by the transcription with the higher combined score or both. These adjustments can be made on a trial basis and subsequent tests can be performed to monitor and increase accuracy.

Some embodiments use a corpus of ASR scores with presumably correct transcriptions. Such as system can compute or use a cost function for the interpretation of a large number of samples in the corpus. An appropriate cost function would be based on the number of correctly interpreted transcriptions or best overall correctness of combined ASR and NLU scores for all transcriptions in the corpus. By computing the cost function for varying sets of grammar phrasing weights, it is possible to apply a gradient descent algorithm to find an optimal set of phrasings weights for the corpus.

In addition to the techniques discussed above with respect to FIG. 2, an optional step of running cross-domain tests can be performed to check if any other grammars and/or domains support the transcription identified as the correct transcription. If any other grammars and/or domains are found to support the correct transcription, then the system will discard the newly generated transcription without changing the system's grammars. This additional step is an automated way to ensure that the system is not over generating faulty transcriptions that, in essence, steal from other grammars and/or domains.

There are multiple ways in which the weights of the grammars and/or domains can be changed. One way is to use usage data. For example, it is possible to measure the probability of skipping a street suffix, and the probability of including the word "in" before the city name, and so on.

Due to the automatic normalization of weights, the popularity measure of records in a table can be easily entered as raw counts (the number of times each record has been accessed), as long as there is sufficient data to make the weights statistically significant. For example, if a song title has been accessed 1000 times in a table of song titles, the weight of 1000 can be entered as the weight in a record in the table, as long as the raw counts are entered for all other records in the table. Additionally, the technology disclosed can rely on language modeling probabilities and/or native speaker intuition, etc.

Other improvements that can be implemented to improve grammar correction may include enabling various other possible steps for improving ASR accuracy, performing focus acoustic model training on data samples for missing classes, finding underrepresented triphones, updating the phonetic dictionary with new pronunciations, finding misspellings in the phonetic dictionary, inferring phrasings, and avoiding replication of sentences in the corpus for training the language model because such replication would skew the statistics towards selections of transcriptions that have errors.

Figure 4:
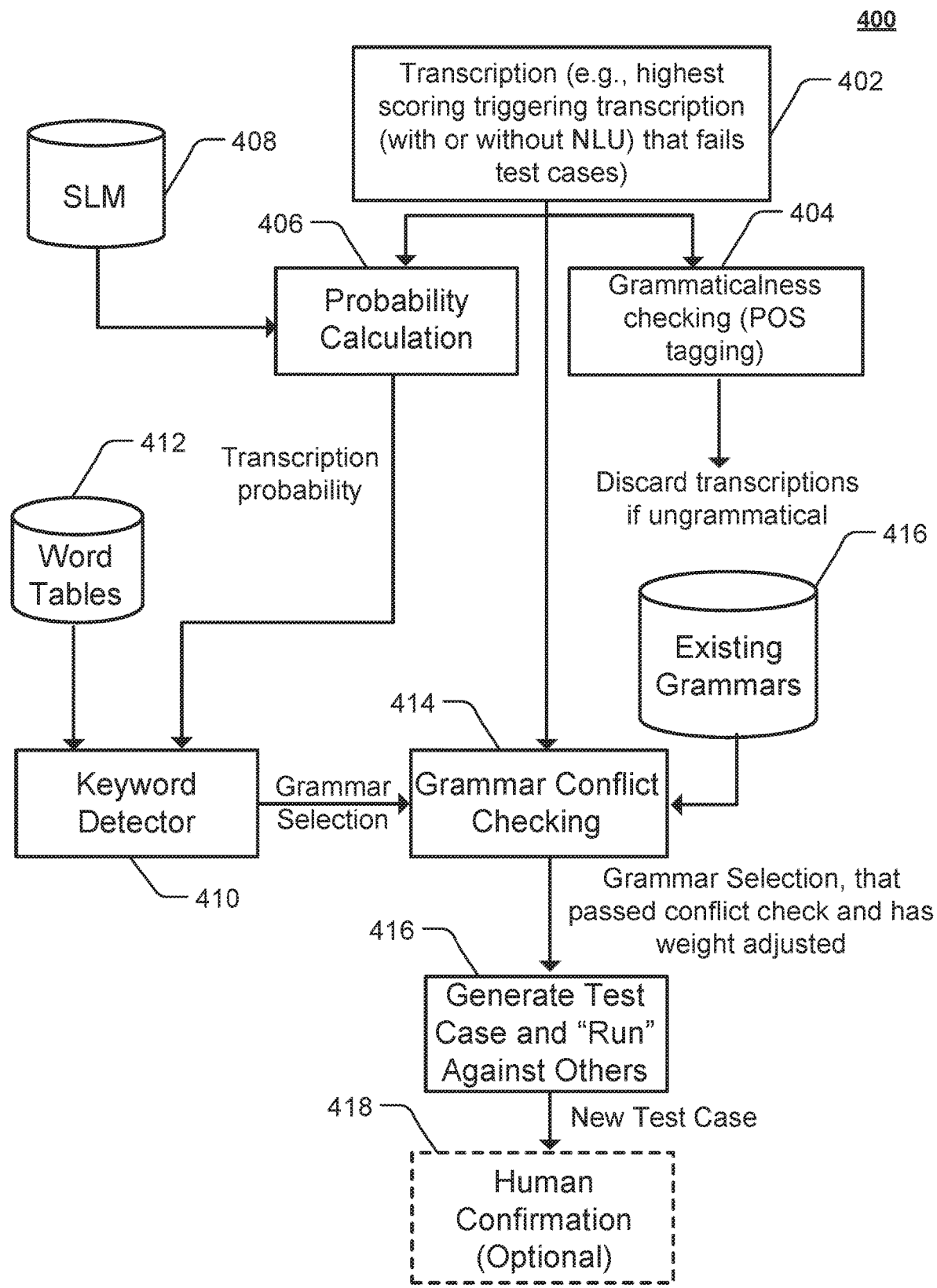
FIG. 4 illustrates a block diagram of an example environment that replaces an NLU-chosen phrasing of a particular transcription with a new phrasing of the particular transcription.

FIG. 4 illustrates a block diagram of an example environment 400 that replaces an NLU-chosen phrasing that interprets a particular transcription with a new phrasing for the particular transcription.

Referring to FIG. 4, the example environment 400 at operation 402 receives a transcription. It could be a transcription that was the highest scoring ASR transcription but failed to be accurately interpreted by a grammar. That would be a useful way to add the most needed grammars to an ASR-NLU system. The transcription can be one that is identified (i) in operation 124 of FIG. 1 as being a transcription for which grammar correction is to be performed, (ii) by the comparator 208 of FIG. 2 as invoking an alert to a QA specialist, or (iii) in any other manner that would indicate that the highest scoring transcription was not selected as the correct transcription by a speech recognition and natural language understanding system. Once the transcription is received, the environment 400 will proceed to determine whether or not a new grammar and/or domain with a new phrasing should be created or whether an existing grammar and/or domain should be updated with a new phrasing.

A grammaticalness checker 404 performs a grammaticalness check on the transcription and terminates the procedure without adding or changing a grammar if the transcription is determined to be ungrammatical. The grammaticalness check can be performed at any stage of any operation described in this document, including all stages and operations described in any of the preceding or subsequent figures. The grammaticalness check can be performed by part-of-speech (POS) tagging the transcription to, for example, replace entities with tags and then determine whether or not the transcription is grammatical. A person of ordinary skill in the art will understand that other methods of performing a grammaticalness check can be implemented.

A probability calculator 406 can calculate a probability that the transcription is sufficiently probable in common language. This can be done using a statistical language model (SLM) 408. An SLM 408 can be used by the probability calculator 406 to determine a probability distribution over sequences of words. The SLM 408 can be implemented to determine the probability that the entire sequence of words is actually a sequence of words that would be used or spoken.

Once the probability is determined, a keyword detector 410 in conjunction with one or more word tables 412 can be implemented to identify keywords in the transcription, locate the identified keywords in the one or more word tables 412, identify grammars and/or domains that are associated with the identified keywords within the one or more word tables 412, and determine the most frequently identified grammar and/or domain from the identified grammars and/or domains that are associated with the keywords located in the one or more word tables 412. The most prevalent identified grammar and/or domain is then selected as the potential grammar and/or domain to which the new phrasing is to be added. In other words, there is an existing grammar and/or domain that has been identified to be the most likely candidate as supporting the highest scoring transcription. As described below, the selected grammar and/or domain can then be edited to include a new phrasing that matches the highest scoring transcription.

It is possible that there are no existing grammars/domains to edit. This can be determined if there are no words in the word tables 412 that match words in the transcription. In such a case, it might be appropriate to create a new grammar.

The keyword detector 410 also has the ability to determine whether or not a new grammar and/or domain should be created to include a phrasing that matches the highest scoring transcription. The keyword detector 410 can make this determination, at least in part, based on the probability calculated by the probability calculator 406. For example, if the calculated probability is above a certain threshold, then the keyword detector 410 can determine that an existing grammar and/or domain should be edited to include the new phrasing that matches the highest scoring transcription; but if the calculated probability is below the certain threshold, then the keyword detector 410 can determine that a new grammar and/or domain should be created to include the phrasing that matches the highest scoring transcription. If the probability is below a lower threshold then the word sequence of the transcription is so unlikely that the minimal harm to overall interpretation accuracy from creating a new grammar or phrasing would not justify the low probability benefit of having such a phrasing. A phrasing matches the transcription if a parse of the grammar as expressed in its programming language matches the sequence of words in the transcription.

The thresholds for determining whether to edit a grammar, add a grammar, or neither can be adjusted to balance between adding too many incorrect phrasings to a particular existing grammar and/or domain and adding fewer phrasings to the particular existing grammar and/or domain than could help. For example, the value of the threshold could depend on how many human resources are available to check system behavior and how many nonsense query responses are acceptable to users. As a further example, if there is no human feedback or validation to check behavior, then the threshold could be set very high. But if there is human feedback or validation to check behavior, then all transcriptions having a probability score over a high threshold can be added as a new phrasing to an existing grammar and/or domain, and then have humans look at the transcriptions that are in a middle range of probability scores as potential new phrasing for an existing grammar and/or domain. If the probability is below a low threshold, then a new grammar and/or domain should not be created.

Additionally, the probability calculation operation can be skipped, and the transcription can be sent to the keyword detector 410 without any probability calculation. The keyword detector 410 could then determine whether or not a new grammar and/or domain should be created or whether an existing grammar and/or domain should be edited to include a new phrasing based on other factors, such as the frequency that one or more words in the transcription are identified in the word tables 412. The level of frequency can be used as a threshold to make the determination of whether or not a new grammar and/or domain should be created to support the new phrasing.

Once the existing grammar is selected by the keyword detector 410 and the system determines that a new phrasing should be created, a grammar conflict checker 414 checks to verify that no other existing grammars and/or domains can interpret the highest scoring transcription. The grammar conflict checker 414 does this by attempting to interpret the transcription according to all other grammars. When the transcription passes the grammar conflict check, the existing grammar and/or domain is updated with a phrasing that matches the transcription, or a new grammar and/or domain is created to include the phrasing that matches the transcription. The new and/or updated grammar (and/or domain) is assigned a weight or its weight is updated. This way the new phrasing that matches the transcription has a weight assigned to it that will cause it to be selected for a same or similar query in the future.

A test generator 416 then takes the existing grammar and/or domain or the newly created grammar and/or domain that includes the new phrasing and generates a test case for the transcription matching the grammar and runs the test case against other transcriptions and all other test cases against the transcription. Each time the procedure of environment 400 is performed, the updated and/or new grammars (and/or domains) with the new phrasings are stored in a test set and used for future regression testing. This allows all of the updated and/or new grammars (and/or domains) to be checked against other transcriptions and against each other for functionality. This also allows cross-domain testing to be performed to see if any of the new phrasings negatively impact other NLU functionality.

At operation 418 a human confirmation can optionally be employed to confirm the accuracy of the newly created phrasing. It is much more efficient to employ a human confirmation at this stage, as opposed to having a human consider each and every highest scoring transcription at the beginning of the process. As discussed above with reference to FIG. 2, a computer system can be implemented to use artificial intelligence to check the accuracy of the newly created phrasing.

Additionally, stop words can be employed to break up the highest scoring transcription before keyword detection is performed by the keyword detector 410 or before the grammar conflict checking is performed by the grammar conflict checker 414.

Furthermore, many of the operations described with respect to FIG. 4, are optional and/or can be bypassed. For example, a transcription can be obtained in operation 402, the keyword detector 410 can search for an existing grammar and/or domain that is able to interpret the transcription, and then a weight corresponding to at least one word of the transcription that matched the existing grammar and/or domain can be changed. This weight can be changed in dependence upon the at least one word of the transcription and whether or not the at least one word that is supported in the matched grammar is a word with intent.

Figure 5:
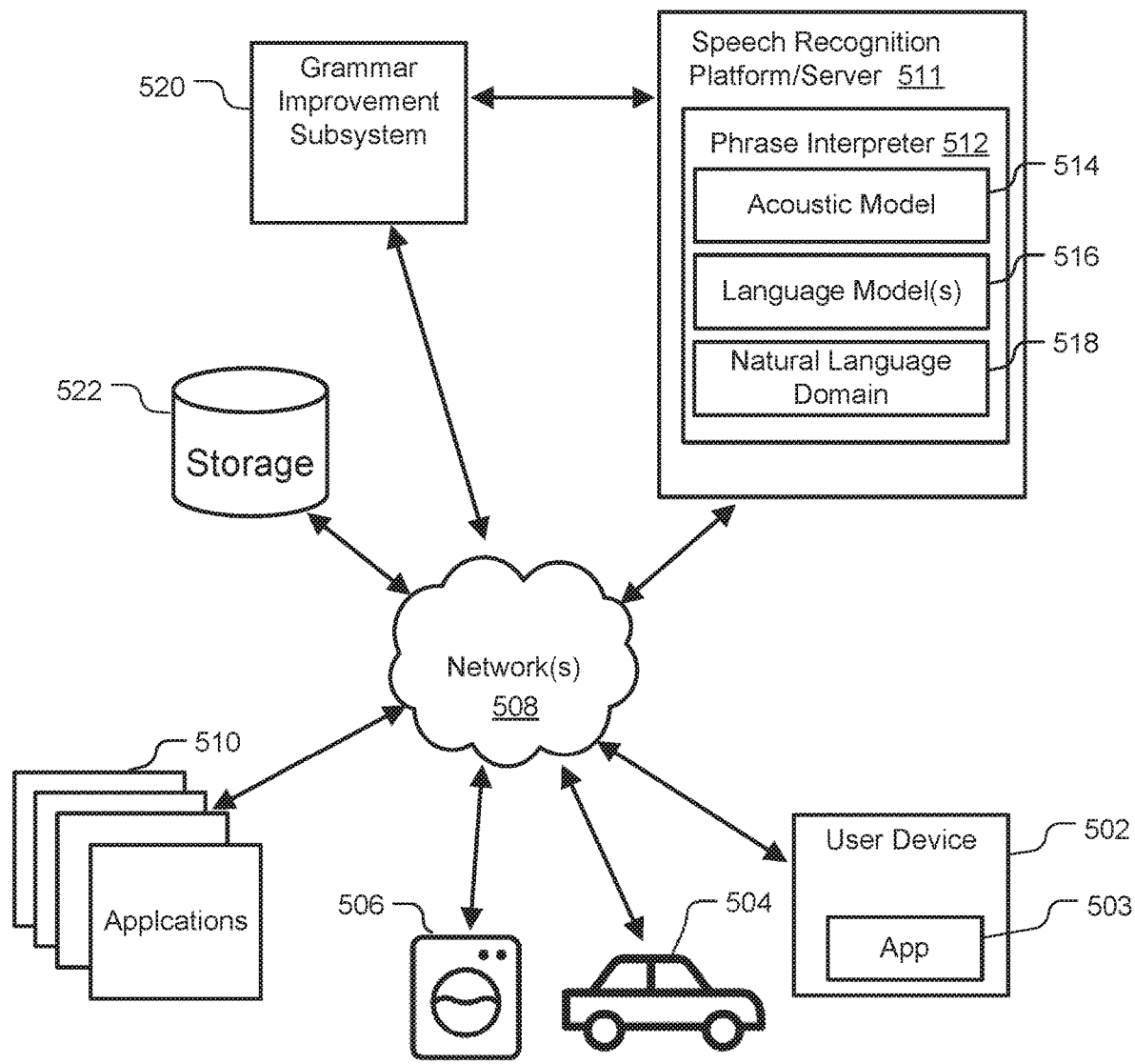
FIG. 5 illustrates a block diagram of an example environment that performs speech recognition and natural language understanding and that also performs grammar improvement.

FIG. 5 illustrates a block diagram of an example environment 400 that performs speech recognition and natural language understanding and that also performs grammar improvement.

Specifically, FIG. 5 illustrates a diagram of an example environment 500 that includes at least one user device 502, 504, 506. The user device 502 could be a mobile phone, tablet, workstation, desktop computer, laptop or any other type of user device running an application 503. The user device 504 could be an automobile and the user device 506 could be a washing machine, each of which is running an application 503. Various example implementations of these user devices are discussed in more detail below. The user devices 502, 504, 506 are connected to one or more communication networks 508 that allow for communication between various components of the environment 500. In one implementation, the communication networks 508 include the Internet. The communication networks 508 also can utilize dedicated or private communication links that are not necessarily part of the Internet. In one implementation the communication networks 508 uses standard communication technologies, protocols, and/or inter-process communication technologies.

The environment 500 also includes applications 510 that can be preinstalled on the user devices 502, 504, 506 or updated/installed on the user devices 502, 504, 506 over the communications networks 508. The environment 500 also includes a speech recognition platform/server 511, which is part of the speech recognition and natural language understanding system. The speech recognition platform/server 511 can be a single computing device (e.g., a server), a cloud computing device, or it can be any combination of computing device, cloud computing devices, etc., that are capable of communicating with each other to perform the various tasks required to perform meaningful speech recognition. The speech recognition platform/server 511 includes a phrase interpreter 512 that performs, for example, performs the ASR transcription and the NLU interpretation as discussed above with reference to FIGS. 1-4. Since the speech recognition platform/server 511 can be spread over multiple servers and/or cloud computing device, the operations of the phrase interpreter 512 can also be spread over multiple servers and/or cloud computing device. The applications 510 can be used by and/or in conjunction with the phrase interpreter 512 to understand spoken input. The various components of the environment 500 can communicate (exchange data) with each other using customized Application Program Interfaces (API) for security and efficiency.

The user devices 502, 504, 506, and the phrase interpreter 512 each include memory for storage of data and software applications, a processor for accessing data in executing applications, and components that facilitate communication over the network 508. The user devices 502, 504, 506 execute applications 503, such as web browsers (e.g., a web browser application 503 executing on the user device 502), to allow developers to prepare and submit applications 510 and allow users to submit speech audio including natural language utterances to be interpreted by the phrase interpreter 512.

The phrase interpreter 512 implements one or more acoustic models 514, language models 516 and natural language domains 518. The language models 516 of the phrase interpreter 512 create a transcription of the received speech audio. The language models 516 can be single stage or multiple stage models that add an application of separate linguistic analysis. For example, the acoustic models 514 can process received speech audio to produce phonemes. These phonemes can be passed to the language models 516 that consider and scores sequences of phonemes. The language models 516 can sometimes use diphone or triphone analysis to recognize likely sequences of phonemes. The language models 516 can use statistical language models to recognize statistically likely sequences of words.

The phrase interpreter 512 is implemented using at least one hardware component and can also include firmware, or software running on hardware. Software that is combined with hardware to carry out the actions of a phrase interpreter 512 can be stored on computer readable media such as rotating or non-rotating memory. The non-rotating memory can be volatile or non-volatile. In this application, computer readable media does not include a transitory electromagnetic signal that is not stored in a memory; computer readable media stores program instructions for execution.

The environment 500 also includes grammar improvement subsystem 520 that performs the operations described above with reference to FIGS. 1-4. The grammar improvement subsystem 520 can perform the operations as discussed above on transcriptions as they are identified as needing grammar improvement operations or the transcriptions that are identified as needing grammar improvement operation can be saved, for example, in storage 522 (e.g., the audio query database 202). Once the grammar improvement is performed, grammars, domains and/or models utilized by the speech recognition platform/server 511 can be updated accordingly so as to increase the accuracy and performance of the speech recognition and natural language understanding.

The phrase interpreter 512, as well as the grammar improvement subsystem 520, the applications 510 and the storage 522 can be wholly or partially hosted and/or executed in the cloud or by other entities connected through the communications networks 508.

Figure 6:
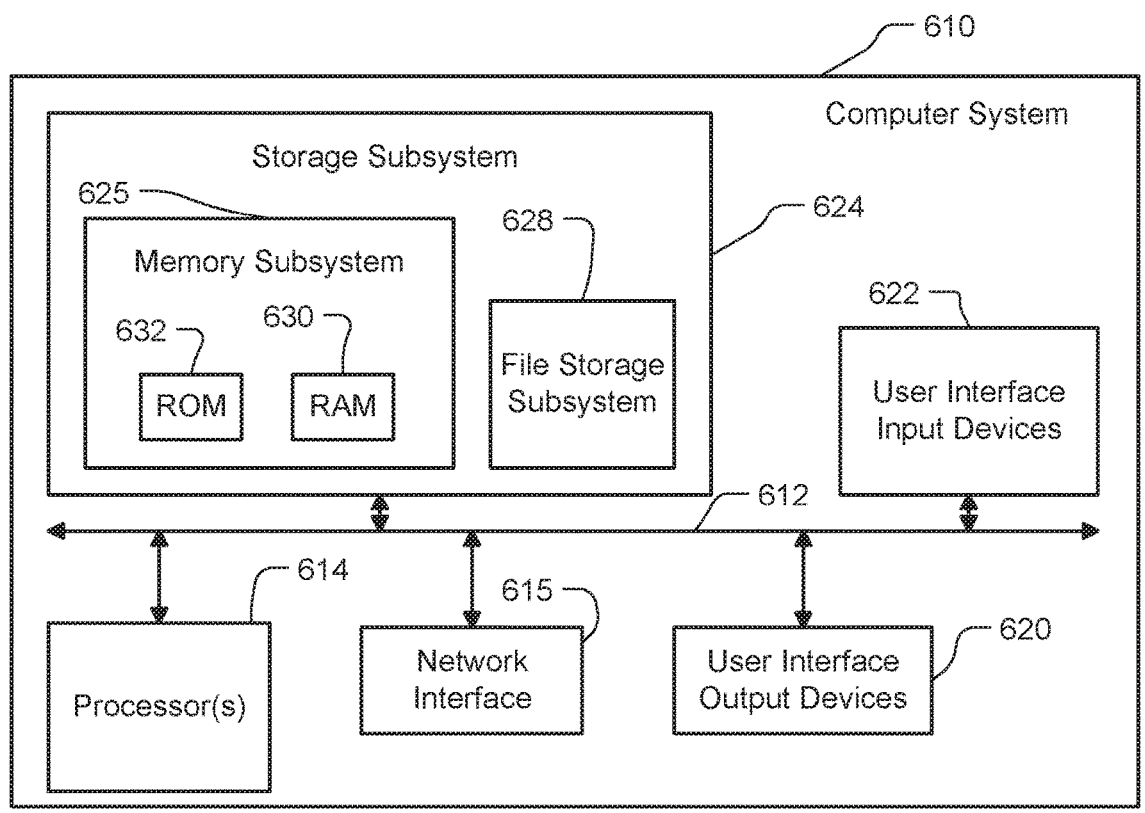
FIG. 6 is a block diagram of an example computer system that can implement various components of the environments of FIG. 1-5.

FIG. 6 is a block diagram 600 of an example computer system that can implement various procedure and components of the environments 100, 200, 300, 400 and 500 of FIGS. 1-5. Computer system 610 typically includes at least one processor 614, which communicates with a number of peripheral devices via bus subsystem 612. These peripheral devices may include a storage subsystem 624, comprising for example memory devices and a file storage subsystem, user interface input devices 622, user interface output devices 620, and a network interface 615. The input and output devices allow user interaction with computer system 610. Network interface 615 provides an interface to outside networks.

User interface input devices 622 may include a keyboard, pointing devices such as a mouse, trackball, touchpad, or graphics tablet, a scanner, a touchscreen incorporated into the display, audio input devices such as speech recognition systems, microphones, and other types of input devices. In general, use of the term "input device" is intended to include all possible types of devices and ways to input information into computer system 610 or onto communication network 508.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. These software modules are generally executed by processor 614 alone or in combination with other processors.

Memory subsystem 625 used in the storage subsystem can include a number of memories including a main random-access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 628 in the storage subsystem 624, or in other machines accessible by the processor.

Bus subsystem 612 provides a mechanism for letting the various components and subsystems of computer system 610 communicate with each other as intended. Although bus subsystem 612 is shown schematically as a single bus, alternative embodiments of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating the various embodiments. Many other configurations of computer system 610 are possible having more or fewer components than the computer system depicted in FIG. 6.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Some Particular Implementations

We describe various implementations of configuring natural language grammars, automatically adjusting phrasings and automatically adjusting grammar weights.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions that, when executed by the one or more processors perform the specific operations described below.

In an implementation for configuring natural language grammars, the operations include, for a stored audio query, identifying a first transcription of the audio query, the first transcription having (i) a first automatic speech recognition (ASR) score and (ii) a first natural language understanding (NLU) score, the first NLU score resulting from a first weighted grammar associated with the first transcription. The operations further include identifying a second transcription of the audio query, the second transcription having (i) a second ASR score and (ii) a second NLU score, and detecting that a difference between the first ASR score and the second ASR score has a signed value with an opposite sign than a sign of a signed value of a difference between the first NLU score and the second NLU score. Additionally, the operations include responsive to detecting the opposite sign: providing, to an evaluator, the audio query and the first and second transcriptions; receiving, from the evaluator, an indication of which of the first transcription and the second transcription is a correct transcription; and adjusting a value implemented to calculate the first NLU score or a value implemented to calculate the second NLU score.

In another implementation, the second NLU score results from a second weighted grammar associated with the second transcription, and the second weighted grammar is different from the first weighted grammar. Additionally, the adjusting may include increasing a weight for the weighted grammar associated with the correct transcription or may include decreasing a weight for the weighted grammar associated with the transcription, of the first and second transcriptions, that is not identified as the correct transcription.

In an implementation, an amount of increasing the weight or decreasing the weight is selected, such that the amount will cause the signed value of the difference between the first NLU score and the second NLU score to have the same sign as the signed value of the difference between the first ASR score and the second ASR score.

In another implementation, the first weighted grammar is from a domain that is associated with the first transcription and the second weighted grammar is from a domain that is associated with a second transcription.

Further, in an implementation, the operations include performing a regression diagnostic of a set of test audio queries using weighted grammars with adjusted weights to identify test audio queries that have inconsistent interpretations using the adjusted weights.

In yet another implementation, the operations include determining whether or not the ASR score of the correct transcription is lower than the ASR score of the transcription that is not identified as the correct transcription, and when the ASR score of the correct transcription is determined to be lower, providing an indication of a domain error, meaning that an incorrect domain is associated with the correct transcription.

In a particular implementation, the operations further include providing, to a developer, the correct transcription, as well as highlighting or identifying words that are present within the correct transcription and that are not present within the transcription that is not identified as the correct transcription.

In an implementation, the evaluator is a human. In a different implementation, the evaluator is a computer system that employs artificial intelligence to provide the indication of which transcription of the first and second transcription is the correct transcription.

In a further implementation, the evaluator identifies the correct transcription by comparing the audio query to the first transcription and the second transcription to determine which of the first transcription and the second transcription more closely matches the audio query.

In yet another implementation, the operations further include identifying one or more domains that support at least one of the first and second transcriptions, calculating a weight for each identified domain, the calculated weight for each respective domain indicating a likelihood that the at least one of the first and second transcriptions supported by the respective domain is the most accurate transcription in comparison to other identified domains, and if a calculated weight for a domain identified as supporting the correct transcription is less than a calculated weight for a domain identified as supporting the transcription that is not identified as the correct transcription, then (i) determining that accuracy can be improved by adjusting weights of the domains and (ii) automatically adjusting the weights of the domains according to raw counts of the correct transcription within each identified domain.

Another implementation of automatically generating phrasings is provided to perform operations including receiving a transcription, performing a grammar conflict check by searching for existing grammars that are able to interpret the transcription and verifying that no existing grammar can interpret the transcription, and adding a phrasing that matches the transcription to an edit grammar.

These operations may further include performing a grammaticalness check of the transcription and aborting the method of automatically generating phrasings if the transcription does not pass the grammaticalness check.

Additionally, in an implementation, the grammaticalness check is performed by part-of-speech (POS) tagging the transcription, such that the transcription does not pass the grammaticalness check when the transcription is determined to be ungrammatical according to language rules associated with a language of the transcription.

In an implementation, the edit grammar is a newly created grammar created to include the new phrasing. In another implementation, the edit grammar is an existing grammar edited to include the new phrasing, and the operations further include computing a probability score of the transcription according to a statistical language model (SLM), and if the probability score is above a threshold, selecting, as the edit grammar, an existing grammar having the most words that match words in the transcription.

In yet another implementation, the edit grammar is selected by (i) identifying keywords in the ASR transcription, (ii) locating the identified keywords in the word table, (iii) identifying grammars associated with the identified keywords located in the word table, and (iv) determining the most frequently identified grammar from the identified grammars that are associated with the keywords located in the word table.

A particular implementation of automatically adjusting grammar weights is provided to perform operations including receiving a transcription, searching for a grammar that is able to interpret the transcription, and changing a weight corresponding to at least one word of the transcription that matched the grammar, the weight being changed in dependence upon the at least one word of the transcription and whether or not the at least one word that is supported in the matched grammar is a word with intent.

Other implementations may include a non-transitory computer readable storage medium storing instructions executable by a processor to perform some or each of the operations of the system described above. Yet another implementation may include a method performing some or each of the operations of the system described above.

I claim as follows:

1. A computer-implemented method for configuring natural language grammars, the method comprising:
    for a stored audio query,
        generating, using a processor, a first transcription of the audio query, the first transcription having (i) first automatic speech recognition (ASR) score and (ii) a first natural language understanding (NLU) score, the first NLU score resulting from a first weighted grammar associated with the first transcription; and
        identifying a second transcription of the audio query, the second transcription having (i) a second ASR score and (ii) a second NLU score;
    detecting that a difference between the first ASR score and the second ASR score has signed value with an opposite sign than a sign of a signed value of a difference between the first NLU score and the second NLU score; and
    responsive to detecting the opposite sign:
        providing, to an evaluator, the audio query and the first and second transcriptions;
        receiving, from the evaluator, an indication of which of the first transcription and the second transcription is a correct transcription;
        adjusting, using a processor, a value implemented to calculate the first NLU score or a value implemented to calculate the second NLU score; and
        calculating at least one of the first NLU score and the second NLU score using the adjusted value.

2. The method of claim 1,
    wherein the second NLU score results from a second weighted grammar associated with the second transcription; and
    wherein the second weighted grammar is different from the first weighted grammar.

3. The method of claim 2, wherein the adjusting comprises:
    increasing a weight for the weighted grammar associated with the correct transcription; or
    decreasing a weight for the weighted grammar associated with the transcription, of the first and second transcriptions, that is not identified as the correct transcription.

4. The method of claim 3, wherein an amount of increasing the weight or decreasing the weight is selected, such that the amount will cause the signed value of the difference between the first NLU score and the second NLU score to have the same sign as the signed value of the difference between the first ASR score and the second ASR score.

5. The method of claim 2, wherein the first weighted grammar is from a domain that is associated with the first transcription and the second weighted grammar is from a domain that is associated with a second transcription.

6. The method of claim h further comprising:
    performing a regression diagnostic of a set of test audio queries using weighted grammars with adjusted weights to identify test audio queries that have inconsistent interpretations using the adjusted weights.

7. The method of claim 1, further comprising:
    determining whether or not the ASR score of the correct transcription is lower than the ASR score of the transcription that is not identified as the correct transcription; and
    when the ASR score of the correct transcription is determined to be lower, providing an indication of a domain error, meaning that an incorrect domain is associated with the correct transcription.

8. The method of claim 7, further including providing, to a developer, the correct transcription.

9. The method of claim 8, further including highlighting or identifying words that are present within the correct transcription and that are not present within the transcription that is not identified as the correct transcription.

10. The method of claim 1, wherein the evaluator is a human.

11. The method of claim 1, wherein the evaluator is a computer system that employs artificial intelligence to provide the indication of which transcription of the first and second transcription is the correct transcription.

12. The method of claim 1, wherein the evaluator identifies the correct transcription by comparing the audio query to the first transcription and the second transcription to determine which of the first transcription and the second transcription more closely matches the audio query.

13. The method of claim 1, further comprising:
    identifying one or more domains that support at least one of the first and second transcriptions;
    calculating a weight for each identified domain, the calculated weight for each respective domain indicating a likelihood that the at least one of the first and second transcriptions supported by the respective domain is the most accurate transcription in comparison to other identified domains; and if a calculated weight for a domain identified as supporting the correct transcription is less than a calculated weight for a domain identified as supporting the transcription that is not identified as the correct transcription, then (i) determining that accuracy can be improved by adjusting weights of the domains and (ii) automatically adjusting the weights of the domains according to raw counts of the correct transcription within each identified domain.

\* \* \* \* \*